United States Patent [19]

Nakagawa et al.

[11] Patent Number: 5,063,462
[45] Date of Patent: Nov. 5, 1991

[54] LED ARRAY AND PARTITIVE DRIVING METHOD THEREFOR USING OVERLAPPING ACTIVATION PERIODS

[75] Inventors: Katsumi Nakagawa; Tatsundo Kawai; Yasuo Kuroda, all of Kanagawa, Japan

[73] Assignee: Canon Kabushiki Kaisha, Tokyo, Japan

[21] Appl. No.: 445,929

[22] Filed: Dec. 5, 1989

Related U.S. Application Data

[63] Continuation of Ser. No. 303,063, Jan. 30, 1989, abandoned, which is a continuation of Ser. No. 135,534, Dec. 17, 1987, abandoned, which is a continuation of Ser. No. 946,178, Dec. 23, 1986, abandoned, which is a continuation of Ser. No. 712,027, Mar. 15, 1985, abandoned.

[30] Foreign Application Priority Data

Mar. 21, 1984 [JP] Japan .................. 59-52338

[51] Int. Cl.$^5$ ........................... H04N 1/04
[52] U.S. Cl. ........................ 358/475; 250/573
[58] Field of Search ............... 358/475; 340/713, 762; 250/573

[56] References Cited

U.S. PATENT DOCUMENTS

| | | | |
|---|---|---|---|
| 3,374,395 | 3/1968 | Donkers et al. | 340/792 |
| 3,432,846 | 3/1969 | Jones et al. | 340/792 |
| 3,493,956 | 2/1970 | Andrews et al. | 340/792 |
| 3,829,653 | 8/1974 | Ensminger et al. | 340/713 |
| 3,835,332 | 9/1974 | Bridges | 250/563 |
| 3,911,422 | 10/1975 | McDowell et al. | 340/792 |
| 3,938,139 | 2/1976 | Day | 340/792 |
| 4,009,566 | 3/1977 | Ho | 340/762 |
| 4,162,126 | 7/1979 | Nakagawa | 356/237 |
| 4,262,292 | 4/1981 | Duley | 340/762 |
| 4,317,137 | 2/1982 | Tompkins | 358/472 |
| 4,318,152 | 3/1982 | Weber | 340/762 |
| 4,639,608 | 1/1987 | Kuroda | 250/578 |
| 4,926,058 | 5/1990 | Iwamoto et al. | 250/578.1 |

FOREIGN PATENT DOCUMENTS

| | | |
|---|---|---|
| 58-114666 | 7/1983 | Japan . |
| 58-114667 | 7/1983 | Japan . |
| 58-114665 | 7/1985 | Japan . |

*Primary Examiner*—Edward L. Coles, Sr.
*Attorney, Agent, or Firm*—Fitzpatrick, Cella, Harper & Scinto

[57] ABSTRACT

An LED array has a plurality of LED blocks each of which can independently be illuminated or extinguished. The LED array includes an illumination control unit for illuminating, after the lapse of a time period T1 after a block is illuminated, a succeeding block; an extinguishment control unit for extinguishing, after the lapse of a time period T2 after a block is illuminated, another block which has been illuminated since before the former block was illuminated; and a time control unit for determining the time period T2. The time control unit is adapted to automatically control the time period T2 in accordance with the outputs from a line sensor which reads out an original image illuminated by the LED array.

13 Claims, 4 Drawing Sheets

LED ARRAY AND PARTITIVE DRIVING METHOD THEREFOR USING OVERLAPPING ACTIVATION PERIODS

This application is a continuation of application Ser. No. 303,063 filed Jan. 30, 1989, now abandoned, which is a continuation of application Ser. No. 135,534 filed Dec. 17, 1987, now abandoned, which is a continuation of application Ser. No. 946,178, filed Dec. 23, 1986, now abandoned, which is a continuation of application Ser. No. 712,027 filed on Mar. 15, 1985, now abandoned.

BACKGROUND OF THE INVENTION

1. Field of the Invention

The present invention relates to an LED array which is used for instance in an illumination system for a read-out photosensor, and more particularly it relates to an LED array divided into blocks which may independently be illuminated or extinguished and to a partitive driving method for such an LED array.

2. Description of the Prior Art

In general, an image pick up device such as facsimile reads out image information of an original image by radiating light rays from a light source upon the original image and by detecting the reflected light therefrom with a photosensor. Among photosensors of this kind, there is known in the art a contact type photosensor which is mounted on an original read-out section of such a device. The original read out section for reading out an original includes: photosensors facing the original and having a one dimensional area corresponding to the width and length of the original; a one dimensional light source; and a light transmission member such as CELFOC lens (merchandise name, manufactured by Japan CELFOC Kabushiki Kaisha) and optical fibers. The one dimensional light source for use with the contact type photosensor is for example a fluorescent lamp, or an array member in which LED chips are disposed linearly at constant intervals (such as 2.5 mm).

The use of an LED array as a light source, however, gives rise to a problem that the accumulation of heat generated in the LEDs causes a temperature rise in the LED array thus reducing the life span of the device. This is because a plurality of LEDs on the LED array have heretofore been illuminated concurrently. To avoid a temperature rise, it can be thought of that a larger radiator or an air-cooling fan may be provided for radiating heat. However, these countermeasures can not settle the problem entirely satisfactorily in that they become a bar to the miniaturization of the original read out section and a rise in cost is brought about.

SUMMARY OF THE INVENTION

The present invention has been made so as to solve the above problems, and it is an object of the present invention to provide an LED array and a partitive driving method therefor which can reduce the amount of heat generated by the LED array.

According to the present invention provided are an LED array and a partitive driving method therefor, wherein the LED array is divided into a plurality of LED blocks which can independently be illuminated or extinguished, the LED array being provided with: illumination control means for illuminating, after the lapse of a time period T1 after a block is illuminated, the succeeding block; extinguishment control means for extinguishing, after the lapse of a time period T2 after a block is illuminated, another block which has been illuminated since before the former block was illuminated; and time control means for determining the time period T2.

DETAILED DESCRIPTION OF THE PREFERRED EMBODIMENTS

The embodiments of the present invention will be described definitely and minutely with reference to the accompanying drawings.

Figure 1:
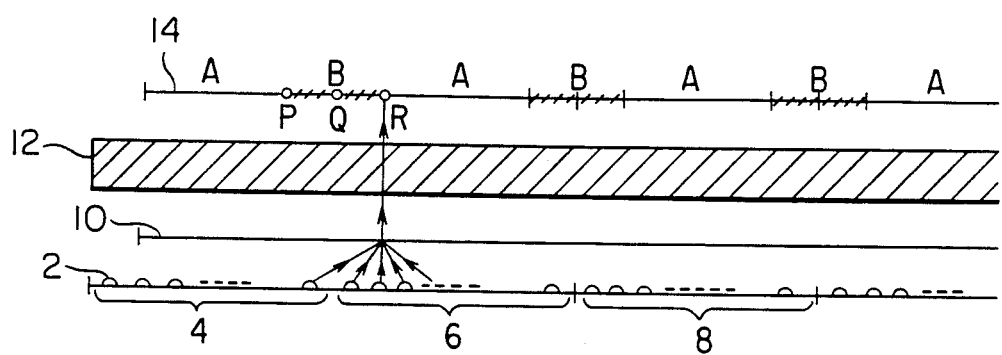
FIG. 1 is a schematic view showing the construction of an original read-out section.

FIG. 1 is a brief schematic view of the construction of an original read-out section. As particularly shown in the figure, an LED array 2 is divided into a first block 4, a second block 6, a third block 8 and so on. The LEDs in each of the blocks are all illuminated at the same time and extinguished at the same time. An original 10 is given light with the LED array 2 and the image of the original 10 is focussed onto a line sensor 14 through a divergent light transmission member 12 The line sensor 14 is composed of high-sensitivity elements which, sequentially from the left to the right in the figure, read out the original 10.

Regions in the line sensor 14 where sufficient brightness can be obtained by the illumination of only a single block are here represented by A, and the region where sufficient brightness can be obtained by the illuminations of adjacent two blocks are represented by B.

In a first embodiment of the LED array according to the present invention, there are provided illumination control means (not shown) for illuminating, after the lapse of a time period T1 after a block is illuminated, a succeeding block; extinguishment control block (not shown) for extinguishing, after the lapse of time period T2 after a block is illuminated, another block which has been illuminated since the time before the former block was illuminated; and time control means (not shown) for adjusting the time period T2. The time control means is adapted to automatically control the time period T2 in accordance with the outputs from the line sensor 14.

Figure 2:
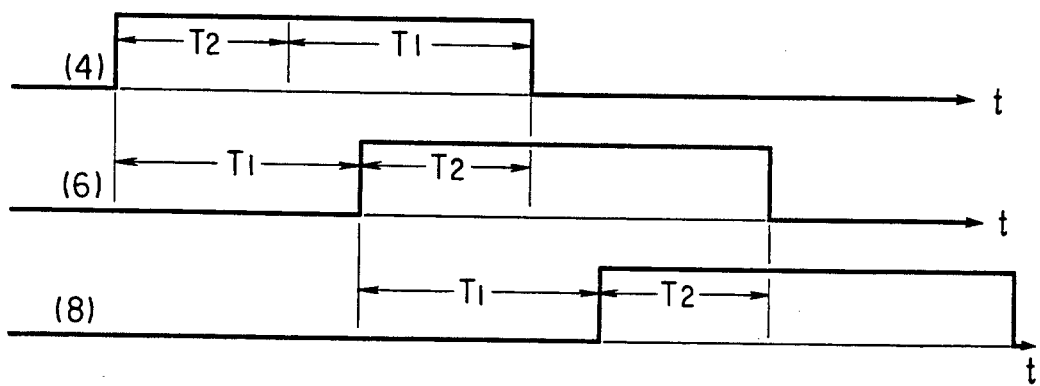
FIG. 2 shows illumination timing charts for respective LED blocks.

The operation of the first embodiment will now be described. FIG. 2 shows the sequence of illumination timings of the respective blocks. The state shown here is that the first block 4 is already illuminated at the instant when the second block 6 is illuminated. After the lapse of a time period T1 after the second block 6 is illuminated, the third block 8 is illuminated under control of the illumination control means (not shown), while the first block 4 is extinguished under control of the extinguishment control means (not shown) after the lapse of the time period T2 after the second block 2 is illuminated.

Figure 3:
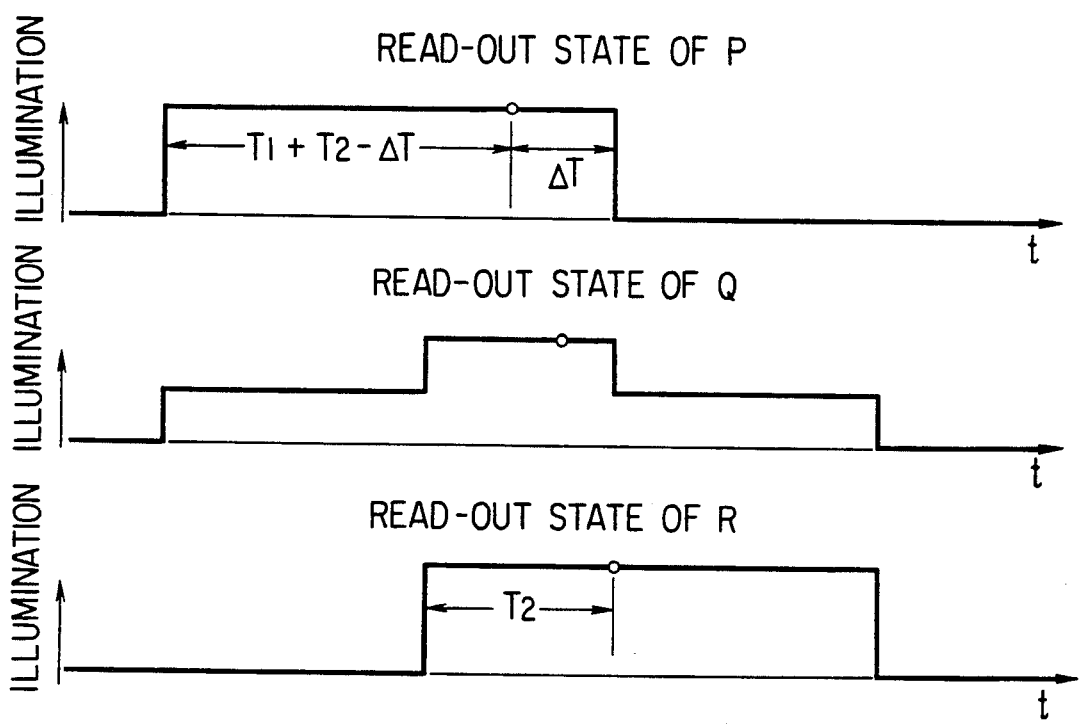
FIG. 3 shows timing charts for respective elements P, Q, and R on a line sensor relative to the intensity of illumination of input lights to the elements.

With the illumination sequence as above, the intensity of illumination of input light onto each of the elements P, Q, and R (FIG. 1) on the line sensor 14 is shown in FIG. 3. The intensity of illumination on the element P is determined only by the first block, while the intensity of illumination on the element R is determined only by the second block 6. The intensity of illumination on the element Q, however, is determined by both first and second blocks 4 and 6. The period during which a sufficient intensity of illumination can be obtained for the element Q is the time period T2 during which both first and second blocks 4 and 6 are illuminated. The time period $\Delta T$ shown in the figure represents a time difference between the time instants when the read-out states of the elements P and R are effected, respectively.

The time period T1 is determined mainly by the scanning rate of the line sensor 14. In particular, assuming that the number of LED blocks is N and the scanning time required for scanning from the left end to the right end of the line sensor 14 is tl, then the following relation yields;

$$NT1 - \Delta T = tl \quad (1)$$

that is, $$T1 = (tl + \Delta T)/N \quad (2)$$

The time period T2 can be considered as a time period required for the element in the line sensor 14 to attain substantially a steady state, the time period thus depending upon the characteristics of the line sensor.

In the above illumination conditions, an illumination time period for a single LED block becomes (T1+T2). If all of the LEDs are illuminated at the same time without the reduction of the present invention, the illumination time period required for such case becomes tl+T2. Therefore, by virtue of the present invention, the illumination time period is reduced by a ratio of:

$$r = \frac{T1 + T2}{tl + T2} = \frac{T1 + T2}{NT1 + T2 - \Delta T} \quad (3)$$

(r represents an illumination time ratio)

For instance, if it is here assumed that N=5, T1=T2, and $\Delta T = \frac{1}{2}T1$, then the ratio becomes $r \approx 36\%$, which remarkably reduces the heat generation in the LEDs and in turn contributes to the characteristics of the line sensor 14 being stabilized, and long-life, low-cost, and compactness of the sensor unit can be obtained.

The adjustment of the time period T2 by the time control means (not shown) in the first embodiment will be described. The equation (3) shows the fact that the heat generation in the LEDs is suppressed to a larger degree as the time period T2 becomes shorter. For instance, for the time period T2=1/5T1, $r \approx 26\%$ is obtained. However, since the time period T2 depends on the characteristics of the sensor element as described previously, it is impossible to set the time period T2 arbitrarily. In FIG. 3 the sensor element P takes a read-out state after $(T1+T2-\Delta T)$ seconds after the block 4 is illuminated, while the element R takes a read-out state after T2 seconds after the block 8 is illuminated. Therefore it is concluded that the time period T2 should be determined so as to make the difference between outputs from both sensor elements as small as possible.

Figure 4:
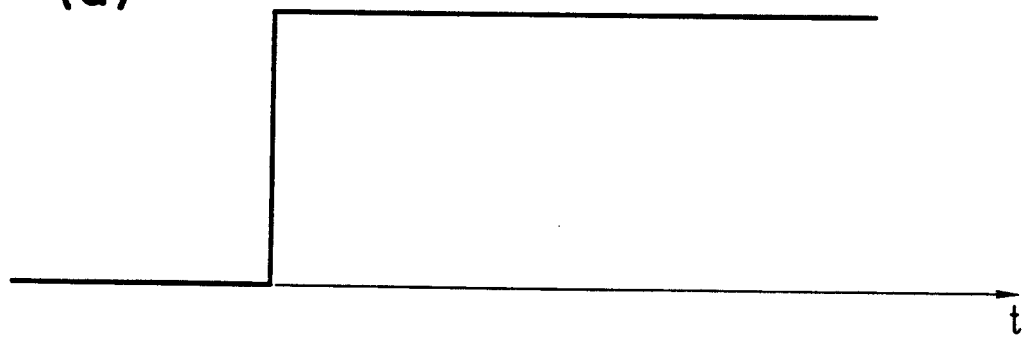
FIGS. 4a–b show timing charts relative to the intensity of illumination of an LED and an output of the line sensor element.
Figure 4:
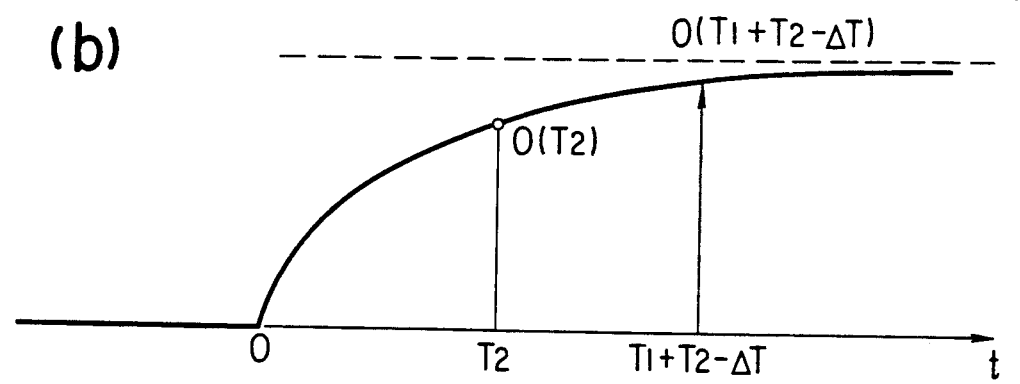

FIG. 4(a) shows the intensity of illumination of the LED, and FIG. 4(b) shows the output of an element in the line sensor 14 receiving light from the LED showing with FIG. 4(a).

Figure 5:
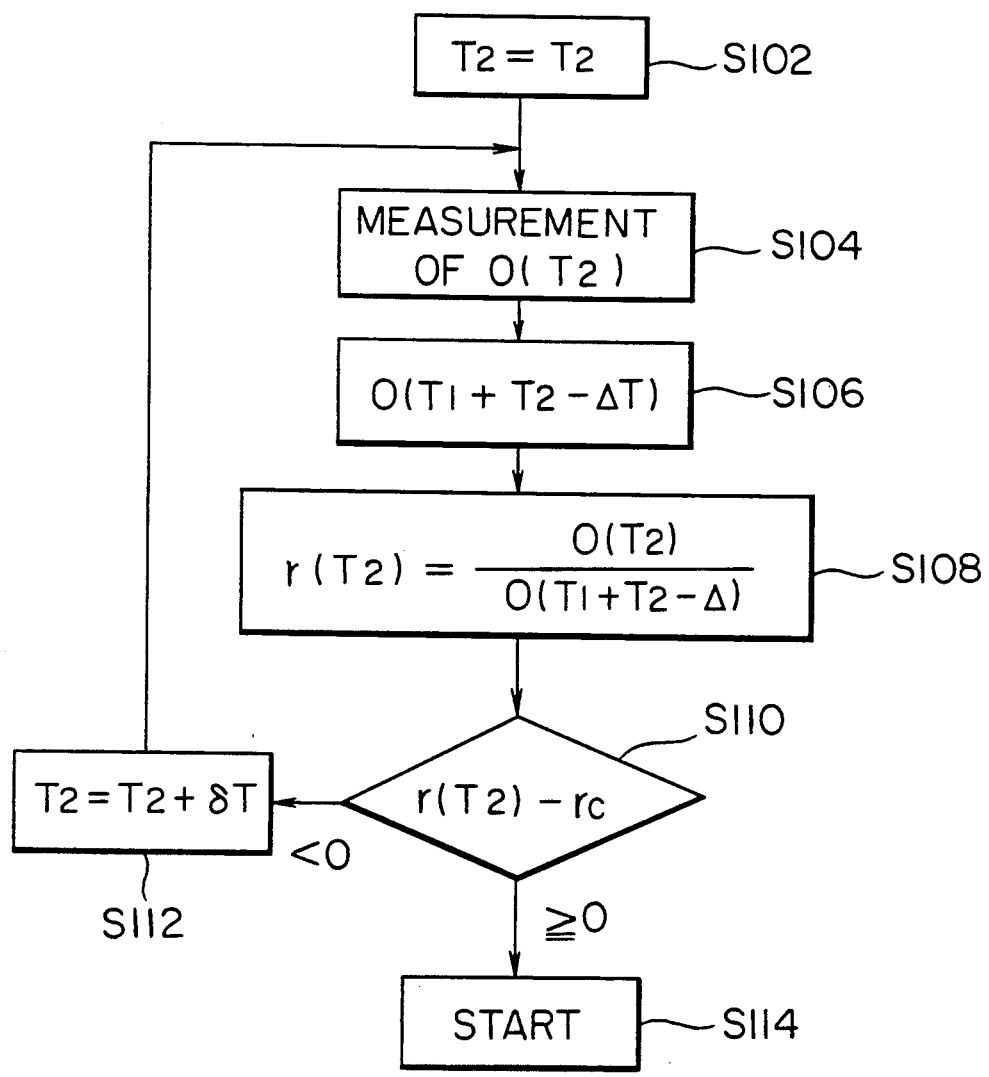
FIG. 5 is a flow chart explaining the processes for determining a time period T2.

In determining the time period T2 as described above, after the outputs O(T2) and O(T1+T2-$\Delta T$) are measured respectively at time instants T2 and T1+T2-$\Delta T$, the time period T2 is determined such that the ratio r(T2) of O(T2) to O(T1+T2-$\Delta T$) exceeds a certain constant value rc (e.g., 0.9). By so determining, the difference of the outputs becomes sufficiently small. The processes for determining the time period T2 as above are described with reference to the flow chart shown in FIG. 5. First, at step S102, an initial value of T2 for the time period T2 is set. At steps S104 and S106, the outputs O(T2) and O(T1+T2-$\Delta T$) are measured, respectively. At step S108, the ratio r(T2) of O(T2) to O(T1+T2-$\Delta T$) is calculated. Next, at step S110, a judgement is made whether the ratio r(T2) exceeds the value rc (already set at for example 0.9) or not. If the ratio r(T2) is smaller than the value rc, then at step S112 a small incremental time period T is added to the time period T2 and step S104 follows thereafter. Alternatively, if the ratio r(T2) reaches or exceeds the value rc at step S110, then step S114 follows to perform succeeding processings using the time period T2 obtained at step S110. In brief, in the processes shown in FIG. 5, determining the time period T2 is effected by increasing in succession the value T2 starting from its initial value T2 until the ratio r(T2) reaches or exceeds the rc value.

Figure 6:
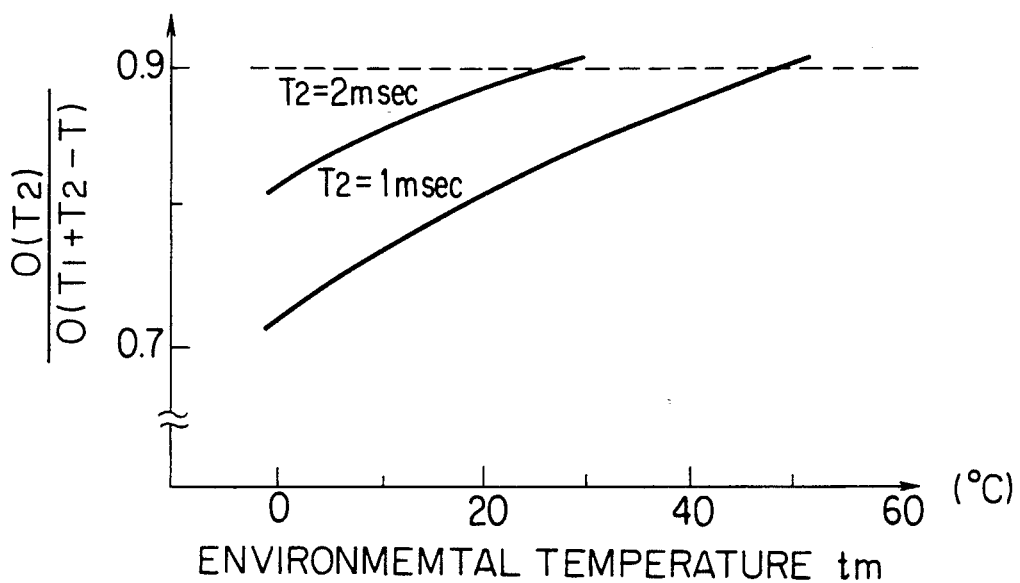
FIG. 6 is a graph showing a relation between the environmental temperature tm, an output ratio $O(T2)/O(T1+T2+\Delta T)$, and the time period T2.
Figure 7:
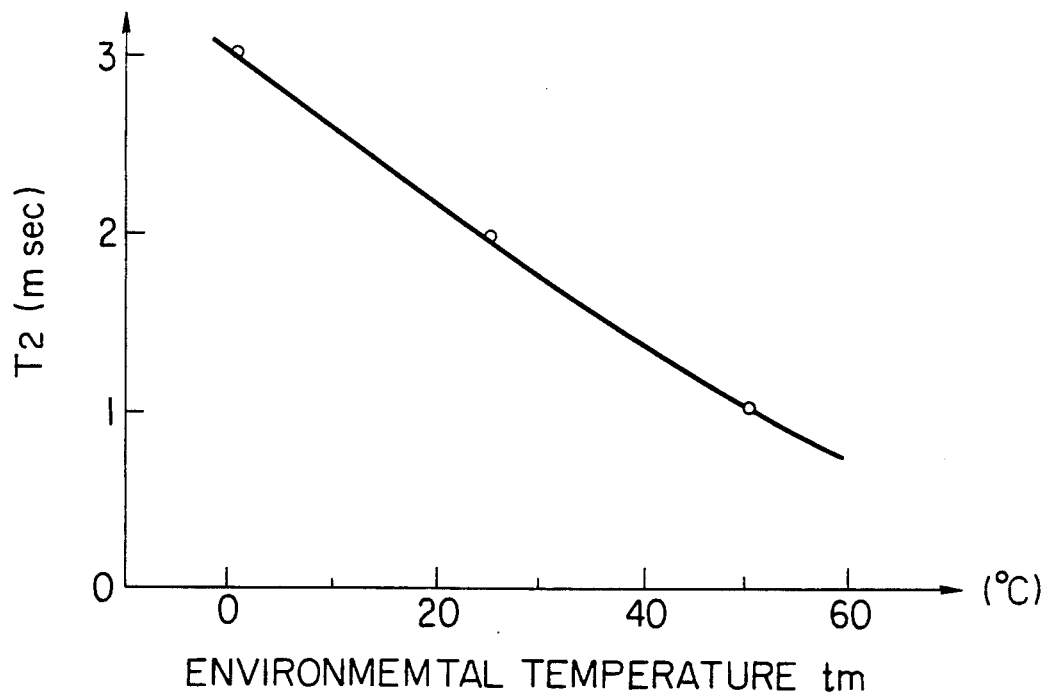
FIG. 7 is a graph showing a relation between the environmental temperature tm and the time period T2.

A second embodiment concerning about the present invention is shown illustrated in FIGS. 6 and 7. The features of the second embodiment reside in that a time control means being provided for determining the time period T2 in accordance with the environmental temperature. FIG. 6 shows a relation between the environmental temperature tm and a ratio of O(T2)/O(T1+T2-$\Delta T$) obtained based upon the measurement results and using T2 as a parameter, wherein the horizontal axis shows the temperature and the vertical axis shows the ratio. It is seen that as the environmental temperature tm rises, the ratio O(T2)/O(T1+T2-$\Delta T$) also increases. By determining from the figure the values T2 which can attain a desired ratio O(T2)/O(T1+T2-$\Delta T$) such, as 0.9, at a certain temperature, a relation between the environmental temperature tm and the time period T2 can be obtained as shown in FIG. 7. As seen from FIG. 7, as the environmental temperature rises, the time period T2 decreases: for instance, although T2=3 msec at the tm of 0° C., T2 becomes 1 msec at the tm of 50° C. In other words, by using a shorter time period T2 at a high environmental temperature, the heat generation in the LED array is reduced as explained with respect to the equation (3).

In the second embodiment, the environmental temperature is measured using thermistors, thermocouples or the like and the time control means is provided which can automatically set the previously stored time period T2 which is most suitable for the measured environmental temperature.

As appreciated from the foregoing detailed and definite description of the present invention, the heat generation of the LED array can be suppressed to the minimum so that the deterioration of the LED and the increase in dark current of sensor elements due to the heat generation of the LED array can be avoided.

What we claim is:

1. A partitive driving method for an LED array having a plurality of LED blocks each of which can independently be turned on, said method comprising the steps of:
   turning on, after the lapse of a time period T1 after a block b is turned on, a succeeding block c;
   extinguishing, after the lapse of a time period T2 after the block b is turned on, another block a which has been in a turned on state since the time before said block b was illuminated; and
   variably setting the time period T2 in accordance with the output of a line sensor which receives light from the LED array.

2. A light source array for an image read-out apparatus including a plurality of blocks having a plurality of light sources, each of said blocks being independently turned on or extinguished, said array comprising:
   illumination control means for turning on, after the lapse of a time period T1 after a first block is turned on, a succeeding block;
   extinguishment control means for extinguishing, after the lapse of a time period T2 after the succeeding block is turned on, the first block which has been turned on since the time before said succeeding block was turned on; and
   time control means for variably setting the time period T2 in accordance with the output signal of a signal source.

3. A light source array according to claim 2, wherein said time control means sets the time period T2 in accordance with the environmental temperature.

4. A light source array according to claim 3, further comprising means for measuring the environmental temperature, comprising a thermistor or a thermocouple.

5. A light source array according to claim 2, further comprising a line sensor for detecting the light output by said blocks, and wherein said time control means sets the time period T2 in accordance with outputs from said line sensor.

6. A light source array according to claim 2, wherein said signal source comprises a line sensor.

7. A light source array according to claim 2, wherein said signal source comprises a device for measuring temperature.

8. A light source array according to claim 2, wherein said light source comprises LEDs.

9. An image reading apparatus comprising:
   a light source array including a plurality of blocks having a plurality of light sources, each of said blocks being independently turned on or extinguished, said array further including illumination control means for turning on, after the lapse of a time period T1 after a first block is turned on, a succeeding block,
   extinguishment control means for extinguishing, after the lapse of a time period T2 after the succeeding block is turned on, the first block which has been turned on since the time before said succeeding block was turned on, and
   time control means for variably setting the time period T2 in accordance with the output signal of a signal source; and
   a line sensor for reading reflected light from an original illuminated by said light source array.

10. An image reading apparatus according to claim 9, further comprising a light transmitter for imaging the reflected light on said line sensor.

11. An image reading apparatus according to claim 9, wherein said apparatus comprises a facsimile machine.

12. An image reading apparatus according to claim 9, wherein said apparatus comprises a contact type image sensor.

13. A partitive driving method for a light source array of an image read-out apparatus having a plurality of light source blocks each of which being independently turned on, said method comprising the steps of:
   turning on, after the lapse of a time period T1 after a block b is turned on, a succeeding block;
   extinguishing, after the lapse of a time period T2 after the block b is turned on, another block a which has been turned on before block b was turned on; and
   variably setting the time period T2 in accordance with the output of a signal source.

* * * * *

UNITED STATES PATENT AND TRADEMARK OFFICE
CERTIFICATE OF CORRECTION

PATENT NO. : 5,063,462                           Page 1 of 3
DATED     : November 5, 1991
INVENTOR(S) : Katsumi Nakagawa, et al.

It is certified that error appears in the above-identified patent and that said Letters Patent is hereby corrected as shown below:

COLUMN 1:

line 23, "pick up" should read --pick-up--;
    line 30, "readout" should read --read-out--;
    line 32, "one dimensional" should read --one-dimensional--;
    line 33, "one dimensional" should read --one-dimensional--;
    line 37, "one dimensional" should read --one-dimensional--;
    line 44, "array" should read --array,--;
    line 50, "satisfactorily" should read --satisfactorily,--;
    line 51, "read" should read --read-(dash)--; and
    line 60, "provided are" should read --are provided--.

COLUMN 2:

line 21, ")/O(T1+T2+$\Delta$T)," should read --)/O(T1+T2-$\Delta$T),--;
    line 38, "member 12 The" should read --member 12. The--;
    line 44, "the region" should read --regions--; and
    line 51, "extinguishment control block" should read --extinguishment control means--;

COLUMN 3:

line 2, "second block 2" should read --second block 6--; and
    line 8, "first block" should read --first block 4,--.

UNITED STATES PATENT AND TRADEMARK OFFICE
CERTIFICATE OF CORRECTION

PATENT NO. : 5,063,462
DATED : November 5, 1991
INVENTOR(S) : Katsumi Nakagawa, et al.

It is certified that error appears in the above-identified patent and that said Letters Patent is hereby corrected as shown below:

COLUMN 4:

line 34, "that" should be deleted; and
line 46, ")/O(T1+T2+$\Delta$T) such," should read
--)/O(T1+T2-$\Delta$T), such--;

COLUMN 5:

line 9, "turned on" should read --turned-on--.

IN THE DRAWINGS:

Sheet 4, Fig. 6, "ENVIRONMEMTAL" should read
--ENVIRONMENTAL--; and

Sheet 4, Fig. 6, "$\dfrac{O(T2)}{O(T1+T2-T)}$" should read
--$\dfrac{O(T2)}{O(T1+T2-\Delta T)}$--; and

UNITED STATES PATENT AND TRADEMARK OFFICE
CERTIFICATE OF CORRECTION

PATENT NO. : 5,063,462

DATED : November 5, 1991

INVENTOR(S) : Katsumi Nakagawa, et al.

It is certified that error appears in the above-indentified patent and that said Letters Patent is hereby corrected as shown below:

Sheet 4, Fig. 7, "ENVIRONMEMTAL" should read --ENVIRONMENTAL--.

Signed and Sealed this

Eighth Day of June, 1993

Attest:

MICHAEL K. KIRK

Attesting Officer

Acting Commissioner of Patents and Trademarks